(12) United States Patent
Patoskie et al.

(10) Patent No.: US 7,860,517 B1
(45) Date of Patent: Dec. 28, 2010

(54) MOBILE DEVICE TRACKING USING MOBILE AGENT LOCATION BREADCRUMBS

(76) Inventors: John P. Patoskie, 708 Beaumont Ct., Allen, TX (US) 75013; Robert R. Hauser, 4134 Nobleman Dr., Frisco, TX (US) 75034

( * ) Notice: Subject to any disclaimer, the term of this patent is extended or adjusted under 35 U.S.C. 154(b) by 1018 days.

(21) Appl. No.: 11/645,195

(22) Filed: Dec. 22, 2006

(51) Int. Cl.
*H04W 24/00* (2009.01)

(52) U.S. Cl. .............. 455/456.1; 455/404.2; 455/456.6; 340/426.19

(58) Field of Classification Search .............. 455/450.1, 455/404.2, 407, 414.1, 456.1–457; 705/8; 701/207–213; 340/989–994, 426.19–426.22, 340/539.19, 825.49; 370/338
See application file for complete search history.

(56) References Cited

U.S. PATENT DOCUMENTS

| | | | |
|---|---|---|---|
| 4,714,995 A | 12/1987 | Materna et al. | |
| 5,465,111 A | 11/1995 | Fukushima et al. | |
| 5,495,533 A | 2/1996 | Linehan et al. | |
| 5,524,253 A | 6/1996 | Pham et al. | |
| 5,604,800 A | 2/1997 | Johnson et al. | |
| 5,675,711 A | 10/1997 | Kephart et al. | |
| 5,721,912 A | 2/1998 | Stepczyk et al. | |
| 5,778,395 A | 7/1998 | Whiting et al. | |
| 5,812,997 A | 9/1998 | Morimoto et al. | |
| 5,859,911 A | 1/1999 | Angelo et al. | |
| 5,930,798 A | 7/1999 | Lawler et al. | |
| 5,982,891 A | 11/1999 | Ginter et al. | |
| 6,038,500 A | 3/2000 | Weiss | |
| 6,055,562 A | 4/2000 | Devarakonda et al. | |
| 6,065,040 A | 5/2000 | Mima et al. | |
| 6,088,689 A | 7/2000 | Kohn et al. | |
| 6,113,650 A | 9/2000 | Sakai | |
| 6,134,580 A | 10/2000 | Tahara et al. | |
| 6,134,660 A | 10/2000 | Boneh et al. | |
| 6,154,777 A | 11/2000 | Ebrahim | |
| 6,172,986 B1 * | 1/2001 | Watanuki et al. ............ | 370/466 |
| 6,199,195 B1 | 3/2001 | Goodwin et al. | |
| 6,202,060 B1 | 3/2001 | Tran | |
| 6,209,124 B1 | 3/2001 | Vermeire et al. | |
| 6,230,309 B1 | 5/2001 | Turner et al. | |
| 6,233,601 B1 | 5/2001 | Walsh | |
| 6,256,773 B1 | 7/2001 | Bowman-Amuah | |
| 6,272,478 B1 | 8/2001 | Obata et al. | |

(Continued)

FOREIGN PATENT DOCUMENTS

JP        2005190103        7/2005

OTHER PUBLICATIONS

Emmerich, et al., "Tigra—An Architectural Style for Enterprise Application Integration", *IEEE*, (Jul. 2001),p. 567-576.

(Continued)

*Primary Examiner*—Kamran Afshar
*Assistant Examiner*—Marisol Fahnert (57) ABSTRACT

A method, a computer readable medium and a system for using a mobile agent to track a mobile device using a plurality of location breadcrumbs in an environment where network access may be unreliable, comprising, registering with a tracking server by a tracking client to receive a location of the mobile agent, receiving a location breadcrumb by the tracking server from the mobile agent, and reporting the location of the mobile agent by the tracking server to the tracking client.

20 Claims, 6 Drawing Sheets

U.S. PATENT DOCUMENTS

| | | |
|---|---|---|
| 6,282,563 B1 | 8/2001 | Yamamoto et al. |
| 6,282,697 B1 | 8/2001 | Fables et al. |
| 6,304,556 B1 | 10/2001 | Haas |
| 6,330,677 B1 | 12/2001 | Madoukh |
| 6,343,265 B1 | 1/2002 | Glebov et al. |
| 6,349,343 B1 | 2/2002 | Foody et al. |
| 6,389,462 B1 | 5/2002 | Cohen et al. |
| 6,438,744 B2 | 8/2002 | Toutonghi et al. |
| 6,442,537 B1 | 8/2002 | Karch |
| 6,452,910 B1 | 9/2002 | Vij et al. |
| 6,477,372 B1 | 11/2002 | Otting et al. |
| 6,496,871 B1 | 12/2002 | Jagannathan et al. |
| 6,600,430 B2 | 7/2003 | Minagawa et al. |
| 6,600,975 B2 | 7/2003 | Moriguchi et al. |
| 6,611,516 B1 | 8/2003 | Pirkola et al. |
| 6,629,032 B2 | 9/2003 | Akiyama |
| 6,629,128 B1 | 9/2003 | Glass |
| 6,662,642 B2 | 12/2003 | Breed et al. |
| 6,671,680 B1 | 12/2003 | Iwamoto et al. |
| 6,687,761 B1 | 2/2004 | Collins et al. |
| 6,701,381 B2 | 3/2004 | Hearne et al. |
| 6,714,844 B1 | 3/2004 | Dauner et al. |
| 6,738,975 B1 | 5/2004 | Yee et al. |
| 6,744,352 B2 | 6/2004 | Lesesky et al. |
| 6,744,358 B1 | 6/2004 | Bollinger |
| 6,744,820 B1 | 6/2004 | Khairallah et al. |
| 6,768,417 B2 | 7/2004 | Kuragaki et al. |
| 6,816,452 B1 | 11/2004 | Maehata |
| 6,831,375 B1 | 12/2004 | Currie et al. |
| 6,851,108 B1 | 2/2005 | Syme |
| 6,862,443 B2 | 3/2005 | Witte |
| 6,876,845 B1 | 4/2005 | Tabata et al. |
| 6,879,570 B1 | 4/2005 | Choi |
| 6,895,391 B1 | 5/2005 | Kausik |
| 6,901,588 B1 | 5/2005 | Krapf et al. |
| 6,904,593 B1 | 6/2005 | Fong et al. |
| 6,931,455 B1 | 8/2005 | Glass |
| 6,931,623 B2 | 8/2005 | Vermeire et al. |
| 6,947,965 B2 | 9/2005 | Glass |
| 6,951,021 B1 | 9/2005 | Bodwell et al. |
| 6,957,439 B1 | 10/2005 | Lewallen |
| 6,963,582 B1 | 11/2005 | Xu |
| 6,981,150 B2 | 12/2005 | Little et al. |
| 6,985,929 B1 | 1/2006 | Wilson et al. |
| 6,993,774 B1 | 1/2006 | Glass |
| 7,010,689 B1 | 3/2006 | Matyas, Jr. et al. |
| 7,043,522 B2 | 5/2006 | Olson et al. |
| 7,047,518 B2 | 5/2006 | Little et al. |
| 7,055,153 B2 | 5/2006 | Beck et al. |
| 7,058,645 B2 | 6/2006 | Seto et al. |
| 7,062,708 B2 | 6/2006 | Mani et al. |
| 7,069,551 B2 | 6/2006 | Fong et al. |
| 7,127,259 B2 * | 10/2006 | Ueda et al. ............... 455/456.1 |
| 7,127,724 B2 | 10/2006 | Lewallen |
| 7,146,614 B1 | 12/2006 | Nikols et al. |
| 7,146,618 B1 | 12/2006 | Mein et al. |
| 7,172,113 B2 | 2/2007 | Olenick et al. |
| 7,174,533 B2 | 2/2007 | Boucher |
| 7,197,742 B2 | 3/2007 | Arita et al. |
| 7,210,132 B2 | 4/2007 | Rivard et al. |
| 7,213,227 B2 | 5/2007 | Kompalli et al. |
| 7,225,425 B2 | 5/2007 | Kompalli et al. |
| 7,228,141 B2 | 6/2007 | Sethi |
| 7,231,403 B1 | 6/2007 | Howitt et al. |
| 7,237,225 B2 | 6/2007 | Kompalli et al. |
| 7,293,261 B1 | 11/2007 | Anderson et al. |
| 7,376,959 B2 | 5/2008 | Warshavsky et al. |
| 7,475,107 B2 | 1/2009 | Maconi et al. |
| 7,477,897 B2 | 1/2009 | Bye |
| 7,496,637 B2 | 2/2009 | Han et al. |
| 7,499,990 B1 * | 3/2009 | Tai et al. ..................... 709/223 |
| 7,502,615 B2 | 3/2009 | Wilhoite et al. |
| 7,506,309 B2 | 3/2009 | Schaefer |
| 7,519,455 B2 | 4/2009 | Weiss et al. |
| 7,566,002 B2 | 7/2009 | Love et al. |
| 7,643,447 B2 * | 1/2010 | Watanuki et al. ............ 370/328 |
| 7,660,777 B1 | 2/2010 | Hauser |
| 7,660,780 B1 | 2/2010 | Patoskie |
| 7,664,721 B1 | 2/2010 | Hauser |
| 7,698,243 B1 | 4/2010 | Hauser |
| 7,702,602 B1 | 4/2010 | Hauser |
| 7,702,603 B1 | 4/2010 | Hauser |
| 7,702,604 B1 | 4/2010 | Hauser |
| 7,774,789 B1 | 8/2010 | Wheeler |
| 7,810,140 B1 | 10/2010 | Lipari et al. |
| 7,823,169 B1 | 10/2010 | Wheeler |
| 2001/0029526 A1 * | 10/2001 | Yokoyama et al. .......... 709/218 |
| 2001/0051515 A1 | 12/2001 | Rygaard |
| 2001/0056425 A1 | 12/2001 | Richard |
| 2002/0032783 A1 | 3/2002 | Tuatini |
| 2002/0035429 A1 | 3/2002 | Banas |
| 2002/0091680 A1 | 7/2002 | Hatzis et al. |
| 2002/0115445 A1 | 8/2002 | Myllymaki |
| 2002/0116454 A1 | 8/2002 | Dyla et al. |
| 2002/0159479 A1 * | 10/2002 | Watanuki et al. ............ 370/466 |
| 2002/0174222 A1 | 11/2002 | Cox |
| 2002/0196771 A1 | 12/2002 | Vij et al. |
| 2003/0009539 A1 | 1/2003 | Hattori |
| 2003/0018950 A1 | 1/2003 | Sparks et al. |
| 2003/0023573 A1 | 1/2003 | Chan et al. |
| 2003/0033437 A1 | 2/2003 | Fischer et al. |
| 2003/0046377 A1 | 3/2003 | Daum et al. |
| 2003/0046432 A1 | 3/2003 | Coleman et al. |
| 2003/0051172 A1 | 3/2003 | Lordermann et al. |
| 2003/0055898 A1 | 3/2003 | Yeager et al. |
| 2003/0070071 A1 | 4/2003 | Riedel et al. |
| 2003/0101441 A1 | 5/2003 | Harrison, et al. |
| 2003/0177170 A1 | 9/2003 | Glass |
| 2003/0191797 A1 | 10/2003 | Gurevich et al. |
| 2003/0191969 A1 | 10/2003 | Katsikas |
| 2003/0225789 A1 | 12/2003 | Bussler et al. |
| 2003/0225935 A1 | 12/2003 | Rivard et al. |
| 2004/0003243 A1 | 1/2004 | Fehr et al. |
| 2004/0015539 A1 | 1/2004 | Alegria et al. |
| 2004/0037315 A1 | 2/2004 | Delautre et al. |
| 2004/0044985 A1 | 3/2004 | Kompalli et al. |
| 2004/0044986 A1 | 3/2004 | Kompalli et al. |
| 2004/0044987 A1 | 3/2004 | Kompalli et al. |
| 2004/0064503 A1 | 4/2004 | Karakashian et al. |
| 2004/0078423 A1 | 4/2004 | Satyavolu et al. |
| 2004/0078687 A1 | 4/2004 | Partamian et al. |
| 2004/0082350 A1 | 4/2004 | Chen et al. |
| 2004/0088369 A1 | 5/2004 | Yeager et al. |
| 2004/0111730 A1 | 6/2004 | Apte |
| 2004/0133656 A1 | 7/2004 | Butterworth et al. |
| 2004/0148073 A1 | 7/2004 | Hawig et al. |
| 2004/0172614 A1 | 9/2004 | Gallagher |
| 2004/0194072 A1 | 9/2004 | Venter |
| 2004/0203731 A1 | 10/2004 | Chen et al. |
| 2004/0220952 A1 | 11/2004 | Cheenath |
| 2004/0221292 A1 | 11/2004 | Chiang et al. |
| 2005/0004727 A1 | 1/2005 | Remboski et al. |
| 2005/0030202 A1 | 2/2005 | Tsuboi |
| 2005/0090279 A9 | 4/2005 | Witkowski et al. |
| 2005/0114832 A1 | 5/2005 | Manu |
| 2005/0141706 A1 | 6/2005 | Regli et al. |
| 2005/0144218 A1 | 6/2005 | Heintz |
| 2005/0163549 A1 | 7/2005 | Shima et al. |
| 2005/0172123 A1 | 8/2005 | Carpentier et al. |
| 2005/0246302 A1 | 11/2005 | Lorenz et al. |
| 2005/0256614 A1 | 11/2005 | Habermas |
| 2005/0256876 A1 | 11/2005 | Eidson |
| 2005/0262155 A1 | 11/2005 | Kress et al. |
| 2005/0281363 A1 * | 12/2005 | Qi et al. ..................... 375/349 |

| | | |
|---|---|---|
| 2006/0005177 A1 | 1/2006 | Atkin et al. |
| 2006/0031850 A1 | 2/2006 | Falter et al. |
| 2006/0040640 A1 | 2/2006 | Thompson et al. |
| 2006/0041337 A1 | 2/2006 | Augsburger et al. |
| 2006/0048145 A1 | 3/2006 | Celli et al. |
| 2006/0080646 A1 | 4/2006 | Aman |
| 2006/0090103 A1 | 4/2006 | Armstrong et al. |
| 2006/0111089 A1* | 5/2006 | Winter et al. ............ 455/414.1 |
| 2006/0112183 A1 | 5/2006 | Corson et al. |
| 2006/0121916 A1 | 6/2006 | Aborn |
| 2006/0123396 A1 | 6/2006 | Fox et al. |
| 2006/0143600 A1 | 6/2006 | Cottrell et al. |
| 2006/0149746 A1 | 7/2006 | Bansod et al. |
| 2006/0167981 A1 | 7/2006 | Bansod et al. |
| 2006/0173857 A1 | 8/2006 | Jackson |
| 2006/0190931 A1 | 8/2006 | Scott et al. |
| 2006/0200494 A1 | 9/2006 | Sparks |
| 2006/0206864 A1 | 9/2006 | Shenfield et al. |
| 2006/0220900 A1 | 10/2006 | Ceskutti et al. |
| 2006/0221901 A1 | 10/2006 | Yaqub et al. |
| 2006/0245406 A1 | 11/2006 | Shim |
| 2006/0256006 A1 | 11/2006 | Nylen |
| 2006/0256008 A1 | 11/2006 | Rosenberg |
| 2006/0272002 A1 | 11/2006 | Wightman et al. |
| 2007/0004432 A1 | 1/2007 | Hwang et al. |
| 2007/0015495 A1* | 1/2007 | Winter et al. ............ 455/414.1 |
| 2007/0026871 A1 | 2/2007 | Wager |
| 2007/0103292 A1 | 5/2007 | Burkley et al. |
| 2007/0112773 A1 | 5/2007 | Joyce |
| 2007/0223432 A1 | 9/2007 | Badarinath |
| 2007/0243880 A1 | 10/2007 | Gits et al. |
| 2008/0077667 A1 | 3/2008 | Hwang et al. |
| 2010/0161543 A1 | 6/2010 | Hauser |
| 2010/0223210 A1 | 9/2010 | Patoskie |
| 2010/0235459 A1 | 9/2010 | Wheeler |

OTHER PUBLICATIONS

Bussler, Christoph "The Role of B2B Engines in B2B Integration Architectures", *ACM*, (Mar. 2002),67-72.
Jandl, et al., "Enterprise Application Integration by means of a generic CORBA LDAP Gateway", *ACM*, (May 2002),711.
Sutherland, et al., "Enterprise Application Integration and Complex Adaptive Systems", *ACM*, (Oct. 2002),59-64.
Ballance, et al., "The Pan Language-Based Editing System for Integrated Development Environments", *ACM*, (Oct. 1990),77-93.
Dilts, et al., "An Inteligent Interface to CIM Multiple Data Bases", *ACM, TALIP*, (Mar. 2004), vol. 3 Issue 1, pp. 491-509.
"Final Office Action", U.S. Appl. No. 11/086,120, (Feb. 23, 2010), 43 pages.
"Non-Final Office Action", U.S. Appl. No. 11/052,680, (Feb. 4, 2010), 12 pages.
"Non-Final Office Action", U.S. Appl. No. 11/086,101, (Sep. 2, 2009), 20 pages.
"Non-Final Office Action", U.S. Appl. No. 11/086,102, (Mar. 5, 2010), 15 pages.
"Non-Final Office Action", U.S. Appl. No. 11/086,121, (Dec. 30, 2009), 25 pages.
"Non-Final Office Action", U.S. Appl. No. 11/439,059, (Oct. 30, 2009), 9 pages.
"Non-Final Office Action", U.S. Appl. No. 11/495,053, (Jun. 10, 2009), 13 pages.
"Non-Final Office Action", U.S. Appl. No. 11/645,197, (Feb. 24, 2010), 13 pages.
"Non-Final Office Action", U.S. Appl. No. 11/645,303, (Feb. 8, 2010), 18 pages.
"Non-Final Office Action", U.S. Appl. No. 10/975,623, (Nov. 12, 2009), 8 pages.
"Notice of Allowance", U.S. Appl. No. 10/975,623, (Feb. 23, 2010), 9 pages.
"Notice of Allowance", U.S. Appl. No. 11/086,101, (Feb. 25, 2010), 9 pages.
"Notice of Allowance", U.S. Appl. No. 11/645,292, (Nov. 17, 2009), 9 pages.
"Notice of Allowance", U.S. Appl. No. 11/645,300, (Nov. 18, 2009), 9 pages.
"Notice of Allowance", U.S. Appl. No. 11/645,302, (Nov. 17, 2009), 8 pages.
"Notice of Allowance", U.S. Appl. No. 11/645,306, (Nov. 17, 2009), 8 pages.
"Restriction Requirement", U.S. Appl. No. 11/645,191, (Jan. 28, 2010), 7 pages.
"Restriction Requirement", U.S. Appl. No. 11/645,192, (Jan. 28, 2010), 6 pages.
"Restriction Requirement", U.S. Appl. No. 11/645,198, (Jan. 28, 2010), 6 pages.
"Restriction Requirement", U.S. Appl. No. 11/645,200, (Feb. 26, 2010), 8 pages.
"Non-Final Office Action", U.S. Appl. No. 11/645,301, (Jan. 6, 2010), 25 pages.
Blackwell, John "Remit—Rule-Based Alert Management Information Tool", *Thesis Florida State University College of Arts and Sciences*, (2004), pp. 1-69.
Forte, "Feature Comparison of Agent and Free Agent", Retrieved from: <www.forteinc.com/agent/features.php> on Jan. 26, 2010, (2002), 3 pages.
Lockemann, Peter C., "Agents and Databases: Friends or Foes?", *Proceedings of the 9th International Database Engineering & Symposium (IDEAS '05)*, (2005), 11 pages.
Russell, Stuart et al., "Artificial Intelligence: A Modern Approach", Pearson (2003), pp. 5, 32-56, 449-454.
Stallings, William "ISDN and Broadband ISDN with Framw Relay and ATM", *Prentice-Hall*, (1999), p. 516.
"Non Final Office Action", U.S. Appl. No. 11/086,211, 25 pages.
"Requirement for Restriction/Election", U.S. Appl. No. 11/086,102, (Apr. 6, 2009), 7 pages.
"Non Final Office Action", U.S. Appl. 1 No. 10/975,827, (Apr. 7, 2009),38 pages.
"Final Office Action", U.S. Appl. No. 11/086,120, (Apr. 14, 2009),48 pages.
"Non Final Office Action", U.S. Appl. No. 11/645,292, (Apr. 17, 2009),40 pages.
"Final Office Action", U.S. Appl. No. 11/052,680, (Feb. 13, 2009),117 pages.
Flanagan, Roxy "Graphic + Internet related tutorials Using Winzip", indexed by www.archive.org,(Oct. 30, 2008),8 pages.
"Non Final Office Action", U.S. Appl. No. 11/645,190, (Mar. 13, 2009),41 pages.
"Non Final Office Action", U.S. Appl. No. 11/645,291, (Mar. 13, 2009),41 pages.
"Non Final Office Action", U.S. Appl. No. 11/645,193, (Mar. 16, 2009),41 pages.
"Notice of Allowance", U.S. Appl. No. 11/086,101, (Mar. 23, 2009),20 pages.
"Non Final Office Action", U.S. Appl. No. 11/052,680, (May 6, 2009),28 pages.
"Non Final Office Action", U.S. Appl. No. 11/645,300, (May 11, 2009),21 pages.
"Non Final Office Action", U.S. Appl. No. 11/645,302, (May 11, 2009),21 pages.
"Stuffit Deluxe", Aladdin Systems,(Jan. 1, 2004),83 pages.
Gu, T. et al., "Toward an OSGi-based infrastructure for context-aware applications", U.S. Appl. No. 11/645,190, Pervasive Computing IEEE, vol. 3, Issue 4. Digital Object Identifier 10.1109/MPRV.2004.19, (Oct.-Dec. 2004),9 pages.
Pantic, M et al., "Simple agent framework: an educational tool introducing the basics of AI programming", U.S. Appl. No. 11/645,190, Information Technology: Research and Education, 2003. Proceedings. ITRE2003.,(Aug. 11-13, 2003),426-430.
Singh, V.K. et al., "DYSWIS: An architecture for automated diagnosis of networks", U.S. Appl. No. 11/645,190, Operations and Management Symposium, 2008, NOMS 2008. IEEE,(Apr. 7-11, 2008),851-854.
"Non Final Office Action", U.S. Appl. No. 10/975,146, (May 26, 2009),21 pages.

"Non Final Office Action", U.S. Appl. No. 11/086,102, (Jun. 2, 2009), 18 pages.

"Non Final Office Action", U.S. Appl. No. 11/645,306, (Jun. 4, 2009), 19 pages.

"Non Final Office Action", U.S. Appl. No. 10/975,623, (Jun. 9, 2009), 6 pages.

"Non Final Office Action", U.S. Appl. No. 11/086,121, (Jun. 22, 2009), 32 pages.

"Advisory Action", U.S. Appl. No. 11/086,121, (Sep. 11, 2009), 3 pages.

"Final Office Action", U.S. Appl. No. 11/052,680, (Oct. 5, 2009), 16 pages.

"Final Office Action", U.S. Appl. No. 11/086,211, (Sep. 29, 2009), 18 pages.

"Non Final Office Action", U.S. Appl. No. 11/086,120, (Aug. 13, 2009), 35 pages.

"Notice of Allowance", U.S. Appl. No. 11/645,190, (Sep. 17, 2009), 8 pages.

"Notice of Allowance", U.S. Appl. No. 11/645,193, (Sep. 17, 2009), 8 pages.

"Notice of Allowance", U.S. Appl. No. 11/645,291, (Oct. 1, 2009), 11 pages.

Praet, et al., "Processor Modeling and Code Selection for Retargetable Compilation", Jul. 2001, *ACM, Todaes* vol. 6, Issue 3, (Jul. 2001), pp. 277-307.

"Final Office Action", U.S. Appl. No. 11/086,102, (Oct. 20, 2009), 13 pages.

"Final Office Action", U.S. Appl. No. 10/975,146, (Dec. 1, 2009), 11 pages.

"Final Office Action", U.S. Appl. No. 10/975,827, (Nov. 23, 2009), 17 pages.

"Advisory Action", U.S. Appl. No. 11/086,120, (May 4, 2010), 3 pages.

"Advisory Action", U.S. Appl. No. 11/495,053, (May 26, 2010), 3 pages.

"Final Office Action", U.S. Appl. No. 11/086,102, (Jul. 1, 2010), 14 pages.

"Final Office Action", U.S. Appl. No. 11/086,121, (Jun. 16, 2010), pp. 1-30.

"Final Office Action", U.S. Appl. No. 11/495,053, (Mar. 17, 2010), 17 pages.

"Final Office Action", U.S. Appl. No. 11/052,680, (May 17, 2010), 12 pages.

"Final Office Action", U.S. Appl. No. 11/645,301, (May 12, 2010), 32 pages.

"Final Office Action", U.S. Appl. No. 11/645,303, (May 21, 2010), 32 pages.

"Non Final Office Action", U.S. Appl. No. 10/975,827, (Mar. 25, 2010), 19 pages.

"Non Final Office Action", U.S. Appl. No. 11/439,059, (Mar. 26, 2010), 6 pages.

"Non Final Office Action", U.S. Appl. No. 11/645,191, (May 5, 2010), 17 pages.

"Non Final Office Action", U.S. Appl. No. 11/645,192, (May 4, 2010), 14 pages.

"Non Final Office Action", U.S. Appl. No. 11/645,194, (Mar. 26, 2010), 26 pages.

"Non Final Office Action", U.S. Appl. No. 11/645,196, (Apr. 28, 2010), 29 pages.

"Non Final Office Action", U.S. Appl. No. 11/645,198, (Apr. 12, 2010), 14 pages.

"Non Final Office Action", U.S. Appl. No. 11/645,200, (May 26, 2010), 34 pages.

Adnan, Syed et al., "A Survey of Mobile Agent Systems", CSE 221, Final Project, Jun. 13, 2000., 12 pages.

Bagci, et al., "Communication and Security Extensions for a Ubiquitous Mobile Agent System (UbiMAS)", *In Proceedings of CF 2005*, Available at <http://portal.acm.org/ft_gateway.cfm?id=1062302&type=pd&coll=GUIDE&dI=GUIDE&CFID=91857573&CFTOKEN=53726080>,(May 2005), pp. 246-251.

Baumann, J. et al., "Mole 3.0: A Middleware for Java-Based Mobile Software Agents", (1998), 18 pages.

Bigus, J.P. et al., "ABLE: A toolkit for building multiagent autonomic systems", IBM Systems Journal, vol. 41, No. 3, 2002., 22 pages.

Brandt, Raimund "Dynamic Adaptation of Mobile Code in Heterogenous Environments", Der Teschnischen Universitat Munchen,(Feb. 15, 2001), 76 pages.

Brazier, F.M.T. et al., "Generative Migration of Agents", Department of Computer Science, Faculty of Sciences, Vrije Universiteit Amsterdam; de Boelelaan 1081a, 1081 HV Amsterdam, The Netherlands {frances, bjo, steen, niek} @cs.vu.I,(Aug. 2002), 4 pages.

Bursell, Michael et al., "Comparison of autonomous mobile agent technologies", (May 12, 1997), 28 pages.

Christopoulou, Eleni et al., "An ontology-based context management and reasoning process for UBIComp applications", Research Academic Computer Technology Institute, Research Unit 3, Design of Ambient Information Systems Group, N. Kazantzaki str., Rio Campus, 26500, Patras, Greece {hristope, goumop, kameas} @cti.gr,(Oct. 2005), 6 pages.

Hasegawa, Tetsou et al., "Inoperability for mobile agents by incarnation agents", AAMAS; Melbourne, Australia; ACM, 1-58113-683, pp. 1006-1007,(Jul. 14, 2003), 2 pages.

Jih, Wan-Rong et al., "Context-aware Access Control in Pervasive Healthcare", Computer Science and Information Engineering, National Taiwan University, Taiwan. jih@agents.csie.ntu.edu.tw., {r93070, yjhsu} @csie.ntu.edu.tw,(2005), 8 pages.

Karnik, Neeran M., et al., "Security in the Ajanta Mobile Agent System", Softw. Pract. Exper. 31, 4 (Apr. 2001), 301-329,(2001), 28 pages.

Korba, Larry "Towards Secure Agent Distribution and Communication", In Proceedings of the 32nd Annual Hawaii International Conference on System Science—vol. 8 (Jan. 5-8, 1999). HICSS. IEEE Computer Society, Washington, DC, 8059.,(1999), 10 pages.

Pauline, Siu Po Lam "Context-Aware State Management for Supporting Mobility in a Pervasive Environment", A thesis submitted to The University of Hong Kong in fulfillment of the thesis requirement for the degree of Master of Philosophy.,(Aug. 2004), 106 pages.

Poggi, Agostino et al., "Security and Trust in Agent-Oriented Middleware", OTM Workshops 2003: 989-1003,(2003), 15 pages.

Qui-Sheng, He et al., "A Lightweight Architecture to Support Context-Aware Ubiquitous Agent System", Department of Computer Science and Engineering, Fudan University, Shanghai 200433, Chain {hequisheng, sltu} @fudan.edu.cn,(Aug. 2006), 6 pages.

Sterritt, Roy et al., "From Here to Autonomicity: Self-Managing Agents and the Biological Metaphors that Inspire Them", Integrated Design and Process Technology, pp. 143-150.,(Jun. 2005), 8 pages.

Walsh, Tom et al., "Security and Reliability in Concordia", In Mobility: Processes, Computers, and Agents ACM Press/ Addison-Wesley Publishing Co., New York, NY, 524-534.,(1999), 10 pages.

Yu, Ping et al., "Mobile Agent Enabled Application Mobility for Pervasive Computing", Internet and Mobile Computing Lab, Department of Computing, Hong Kong Polytechnic University, Hung Hom, Kowloon, Hong Kong {cspyu, csjcao, cswen} @comp.polyu.edu.hk.,(Aug. 2006), 10 pages.

"Advisory Action", U.S. Appl. No. 11/052,680, (Jul. 28, 2010), 3 pages.

"Advisory Action", U.S. Appl. No. 11/645,197, (Oct. 6, 2010), 3 pages.

"Advisory Action", U.S. Appl. No. 11/645,303, (Jul. 28, 2010), 3 pages.

"Final Office Action", U.S. Appl. No. 10/975,827, (Sep. 15, 2010), 22 pages.

"Final Office Action", U.S. Appl. No. 11/645,192, (Sep. 15, 2010), 14 pages.

"Final Office Action", U.S. Appl. No. 11/645,194, (Sep. 15, 2010), 28 pages.

"Final Office Action", U.S. Appl. No. 11/645,196, (Sep. 22, 2010), 33 pages.

"Final Office Action", U.S. Appl. No. 11/645,197, (Jul. 19, 2010), 16 pages.

"Final Office Action", U.S. Appl. No. 11/645,198, (Sep. 16, 2010), 22 pages.

"Non Final Office Action", U.S. Appl. No. 11/645,301, (Jul. 30, 2010), 18 pages.

"Non Final Office Action", U.S. Appl. No. 11/645,303, (Aug. 19, 2010), 20 pages.

"Non-Final Office Action", U.S. Appl. No. 12/647,964, (Sep. 8, 2010), 5 pages.

"Notice of Allowability", U.S. Appl. No. 10/975,146 (Jul. 13, 2010), 2 pages.

"Notice of Allowance", U.S. Appl. No. 11/086,121, (Oct. 7, 2010), 6 pages.

"Notice of Allowance", U.S. Appl. No. 11/439,059, (Jul. 14, 2010), 12 pages.

"Notice of Allowance", U.S. Appl. No. 12/714,753, (Sep. 27, 2010), 7 pages.

"Notice of Allowance", U.S. Appl. No. 11/495,053, (Aug. 31, 2010), 7 pages.

"The Sims", *Sims, Electronic Arts*, (2000), 57 pages.

"WOW, World of Warcraft", *Wikipedia (online)*, Retreived from Internet in 2010, <URL:http://en.wikipedia.org/wiki/World_of_Warcraft>, (2010), 28 pages.

Barba, Rick "The Sims Prima's Official Strategy Guide", *Prima Publishing*; ISBN: 7615-2339-1, (2000), 98 Pages.

Chang, Yao-Chung et al., "All-IP Convergent Communications over Open Service Architecture", *2005 Wireless Telecommunications Symposium, IEEE*, 0-7803-8856, (2005), pp. 202-210.

Erfurth, Christian et al., "Migration Intelligence for Mobile Agents", Cited by examiner in U.S. Appl. No. 11/645,192 on Sep. 15, 2010, (2001), 8 pages.

Hinchey, Michael G., et al., "Formal Approaches to Agent-Based Systems", *2nd International Workshop FAABS*, (Oct. 2002), 291 pages.

Rosenberg, Jonathan et al., "Programming Internet Telephony Services", *IEEE Network*, (May/Jun. 1999), 8 pages.

Taylor, T.L. "Does WoW Change Everything?", *Games and Culture*, vol. 1, Num. 4, (Oct. 2006), 20 pages.

"Final Office Action", Application Oct. 21, 2010, 34 pages.

* cited by examiner

MOBILE DEVICE TRACKING USING MOBILE AGENT LOCATION BREADCRUMBS

BACKGROUND

An advanced object-oriented computing concept is mobile agent technology. The computer science definition of a mobile agent is a composition of computer software and data which is able to migrate from one computer to another autonomously and continue its execution on the destination computer. The embodiment of a mobile agent refers to a process that can transport its state from one environment to another, with its data intact, and still be able to perform appropriately in the new environment. When a mobile agent decides to move, it saves its own state, transports this saved state to next host, and resumes execution from the saved state.

Location Based Services (LBS) is a growing technology commonly used by mobile network service providers to send information to subscribers that is customized for their location. Paramount to LBS is ability to locate subscribers, and this generally requires input from the mobile device. The predominant location technologies include the Global Positioning System (GPS) and cellular radiolocation. An advancing technology that is gaining momentum is the use of radiolocation in Wireless Fidelity (Wi-Fi) networks.

GPS is a fully functional satellite navigation system that broadcasts precise radio timing signals to ground based GPS receivers. GPS technology allows a receiver to accurately determine its latitude, longitude and altitude, in any weather, day or night, anywhere on Earth. Advanced GPS techniques can enhance the accuracy of location detection to within one centimeter.

In general, radiolocation is the process of locating something through the use of radio waves by analyzing the angle and period of radio signals traveling between a radio receiver and transmitter. In cellular network, the signal strength, the time of arrival, and the angle of arrival of radio waves traveling between a mobile device and a fixed location base station (also referred to a "cell site") can be used to approximate the location of a mobile device. When multiple cell sites are in communication with the device, triangulation, trilateration or multilateration (also known as "hyperbolic positioning") techniques can be locating the device.

Radiolocation can location of devices operating Interoperability for Microwave technique is less effective used to increase the accuracy of also be used to determine the in a Wi-Fi or WiMAX (Worldwide Access) network. However, this in Wi-Fi networks because the location of wireless access points (WAPs) are not necessarily known or fixed. As urban communities add public wireless networks to their infrastructure and record the location of their WAPs, the techniques of radiolocation can be readily applied to Wi-Fi and WiMAX devices.

"Breadcrumbs" (or breadcrumb trails) are a simple navigation technique used to keep track of a subject's path as it traverses from one location to another. The technique takes its name from the bread crumb trail left by Hansel and Gretel in the popular Brothers Grimm fairy tale, "Hansel and Gretel".

DETAILED DESCRIPTION

Mobile Agent Deployment

Mobile agent deployment to a mobile device can precede mobile agent location tracking. To form a basis for articulating one or more embodiments, a process for deploying a mobile agent is presented.

Figure 1:
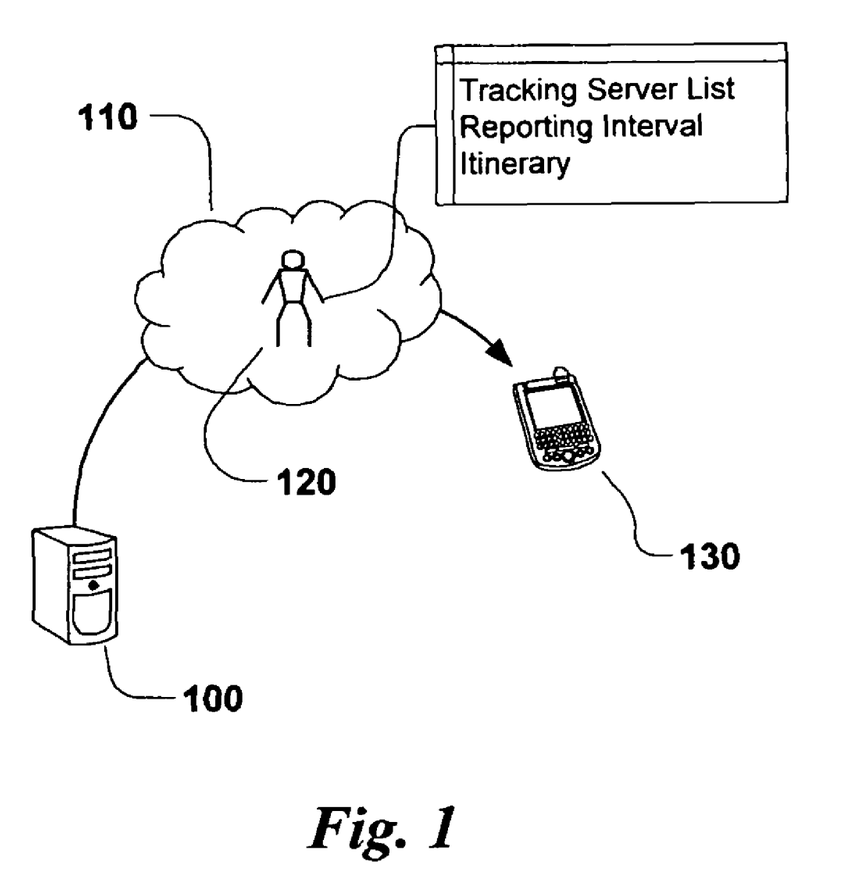
FIG. 1 illustrates a process for deploying a mobile agent to a mobile device according to one or more embodiments.

Referring to FIG. 1, in accordance with one or more embodiments, system 100 creates a mobile agent 120. Mobile agent 120 is deployed to mobile device 130 via a connection through network 110. Mobile agent 120 is capable of working with the LBS and communication capabilities available on mobile device 130, and mobile device 130 is capable of receiving, establishing and executing mobile agent 120. Mobile agent 120 is configured with a prioritized list of well known tracking servers to which it will report, one of which may include system 100. In addition, mobile agent 120 is configured with a maximum reporting interval that may be any unit of time suitable for the application and for the supporting infrastructure. Finally, mobile agent 120 is given a preferred location itinerary (or route) that can be made available to host device 130.

Additional network configuration methods for deploying mobile agents may be utilized. These methods may include, but are not limited to, deployment via wireless area network (WLAN) connection, deployment via satellite connection, deployment via data connection over a cellular network, or deployment via other computer readable media such as disk drives, optical drives and pluggable memory devices.

One or more embodiments describe methods for using a mobile agent to track a mobile device using a plurality of location breadcrumbs in an environment where network access may be unreliable, comprising, registering with a tracking server by a tracking client to receive a location of the mobile agent, receiving a location breadcrumb by the tracking server from the mobile agent, and reporting the location of the mobile agent by the tracking server to the tracking client.

In one or more embodiments, a computer readable medium comprises instructions for: registering with a tracking server by a tracking client to receive a location of a mobile agent; receiving a location breadcrumbs by the tracking server from the mobile agent, wherein the location breadcrumb comprises a location of the mobile agent, a time the location was valid, and an itinerary of the mobile agent; predicting the location of the mobile agent using at least one of, a database of one or more location breadcrumbs, and a database of historical accuracy; and reporting the location of the mobile agent by the tracking server to the tracking client.

One or more embodiments include a system for using a mobile agent to track a mobile device using a plurality of location breadcrumbs in an environment where network access may be unreliable, comprising: a memory that stores a tracking client registration and at least one of, a database of one or more mobile agent location breadcrumbs, and a database of historical accuracy; a first processor communicably coupled to the memory, wherein the processor responds to the tracking client registration, receives a mobile agent location breadcrumb, predicts the location of the mobile agent to the tracking client, and reports the location of the mobile agent to the tracking client; and a second processor communicably coupled to the first processor, wherein the processor reports the location breadcrumb to the first processor.

Client Location Requests

Figure 2:
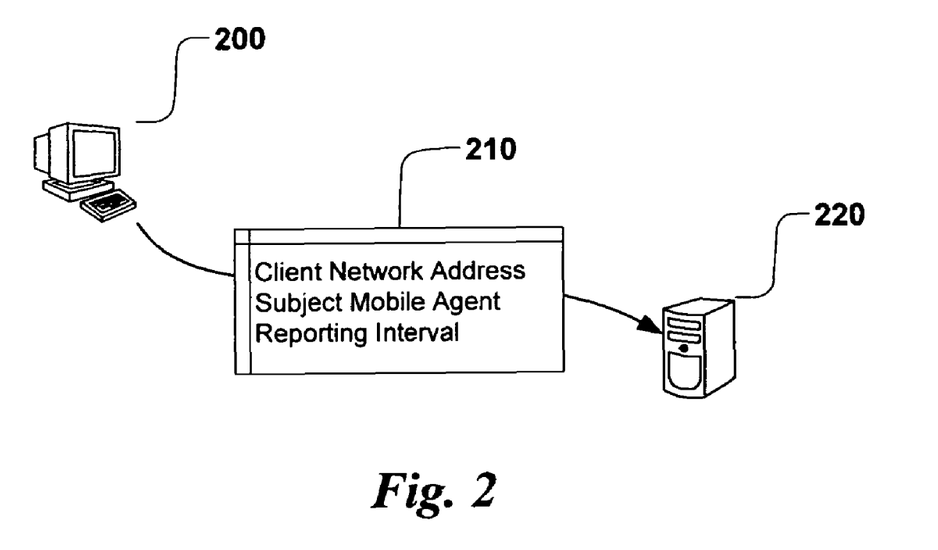
FIG. 2 illustrates a client registration with a tracking server to receive a periodic location update for a mobile agent in accordance with one or more embodiments.

Referring to FIG. 2, in accordance with one or more embodiments, client system 200 registers with mobile agent tracking server 220 to receive location breadcrumbs. Registration data 210 provided by client 200 includes a network address of the client, an identity of a subject mobile agent and a reporting interval.

Figure 3:
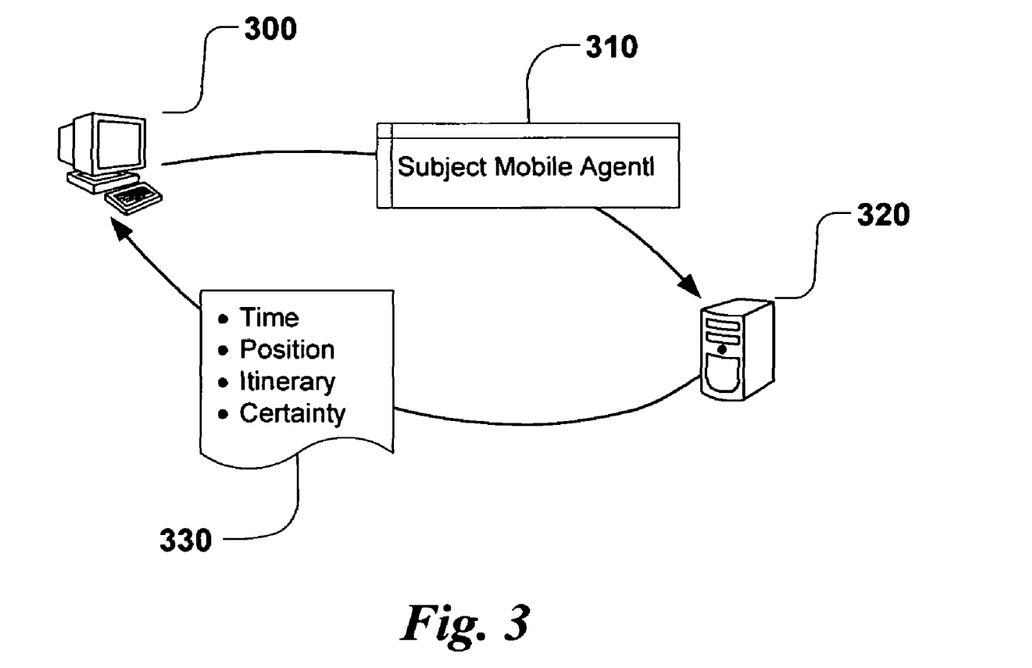
FIG. 3 illustrates a client on-demand request to receive a mobile agent location from a tracking server in accordance with one or more embodiments.

Referring to FIG. 3, in accordance with one or more embodiments, client system 300 requests an on-demand location update from mobile agent tracking server 320. Client 300 provides an identity 310 of a subject mobile agent. Server 320 responds with location update 330.

Location Breadcrumb Tracking

Figure 4:
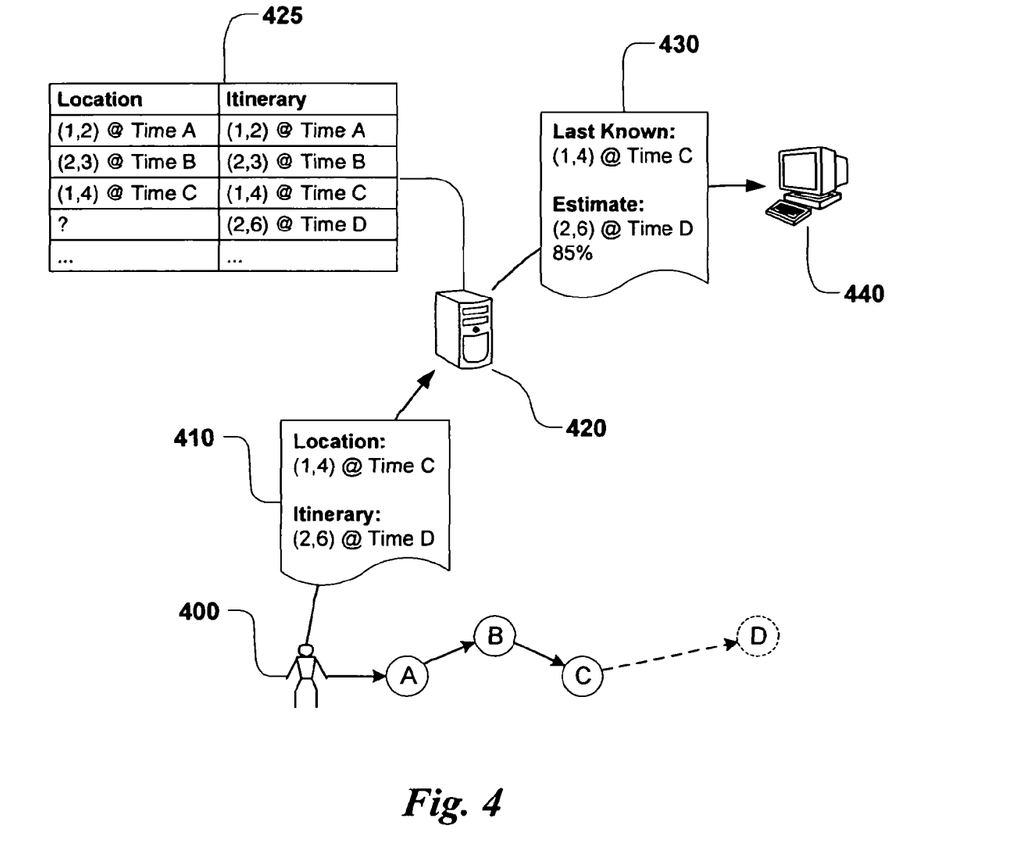
FIG. 4 illustrates a tracking server reporting a location of a predictable mobile agent to a tracking client based on location breadcrumb analysis in accordance with one or more embodiments.

Referring to FIG. 4, in accordance with one or more embodiments, tracking server 420 maintains a breadcrumb database 425 of reported mobile agent breadcrumbs that include time and itinerary. At the expiry of its reporting interval, mobile agent 400 uses a LBS mechanism of its host device to obtain location breadcrumb 410. Mobile agent 400 reports location breadcrumb 410 to tracking server 420 via an available host device network connection. Location breadcrumb 410 identifies an actual location (illustrated as (1, 4)) at time C, and it also identifies an itinerary for its next location (illustrated as (2, 6)) at time D. Tracking server 420 updates its breadcrumb database 425 with location breadcrumb 410.

Approaching time D, tracking client 440 requests the location of mobile agent 400 from tracking server 420. However, mobile agent 400 has not recently reported its position due to a lack of network availability. Using its breadcrumb database 425, tracking server 420 estimates that mobile agent 400 should be near location (2, 6) at time D. Since previous reports by mobile agent 400 matched its itinerary, and since it is not quite time D, tracking server 420 places an 85% degree of certainty on this estimate (an unscientific number chosen to reify this example). Tracking server 420 responds to client 440 by reporting a last known location and estimated location 430 of mobile agent 400.

Figure 5:
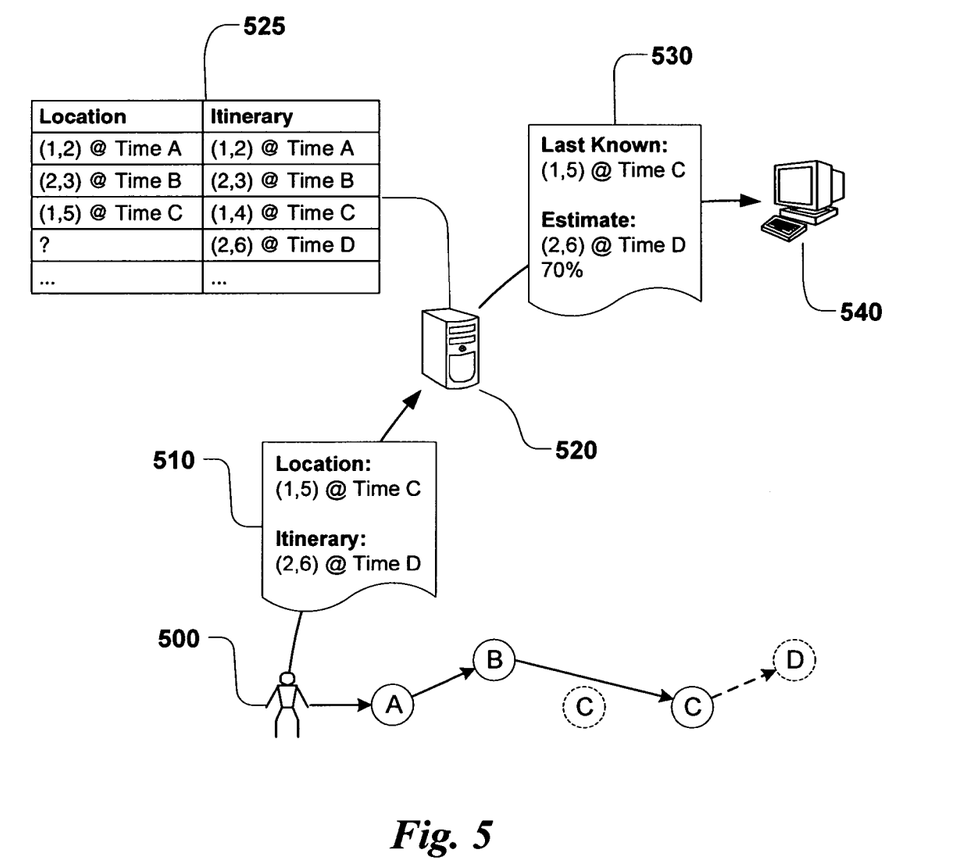
FIG. 5 illustrates a tracking server reporting a location of an unpredictable mobile agent to a tracking client based on location breadcrumb analysis in accordance with one or more embodiments.

Referring to FIG. 5, in accordance with one or more embodiments, tracking server 520 maintains a breadcrumb database 525 of reported mobile agent breadcrumbs that include time and itinerary. At the expiry of its reporting interval, mobile agent 500 uses a LBS mechanism of its host device to obtain location breadcrumb 510. Mobile agent 500 reports location breadcrumb 510 to tracking server 520 via an available host device network connection. Location breadcrumb 510 identifies an actual location (illustrated as (1, 5)) at time C, and it also identifies an itinerary for its next location (illustrated as (2, 6)) at time D. Tracking server 520 updates its breadcrumb database 525 with location breadcrumb 510. Tracking server 520 observes that mobile agent 500's actual location at time C differs from a previous itinerary which indicated mobile agent 500 would be at position (1,4) at time C, not at position (1,5).

Approaching time D, tracking client 540 requests the location of mobile agent 500 from tracking server 520. However, mobile agent 500 has not recently reported its position due to a lack of network availability. Using its breadcrumb database 525, tracking server 520 estimates that mobile agent 500 should be near location (2, 6) at time D. Since previous reports by mobile agent 500 have differed from the itinerary, and since it is not quite time D, tracking server 520 places a 70% degree of certainty on this estimate (an unscientific number chosen to reify this example). Tracking server 520 responds to client 540 by reporting the last known location and estimated location 530 of mobile agent 500.

Figure 6:
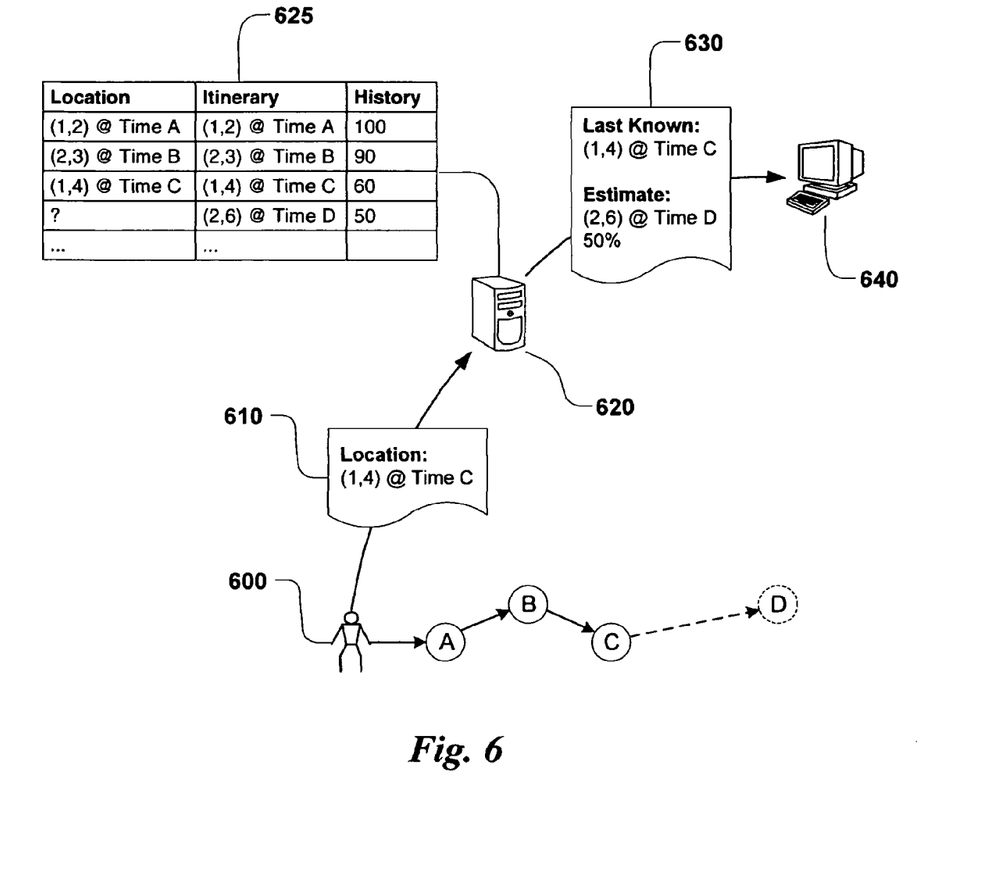
FIG. 6 illustrates a tracking server reporting a location of an unpredictable mobile agent to a tracking client based on historical location breadcrumb analysis in accordance with one or more embodiments.

Referring to FIG. 6, in accordance with one or more embodiments, tracking server 620 maintains a breadcrumb database 625 of reported mobile agent breadcrumbs that include time, itinerary, and historical data. Historical data is represented in FIG. 6 by a simple number that describes tracking accuracy against a plurality of previous itineraries for a given location; however, mobile agent history may be represented by a more sophisticated collection of data. At the expiry of its reporting interval, mobile agent 600 uses a LBS mechanism of its host device to obtain location breadcrumb 610. Mobile agent 600 reports location breadcrumb 610 to tracking server 620 via an available host device network connection. Location breadcrumb 610 identifies an actual location (illustrated as (1, 5)) at time C. Tracking server 620 updates its breadcrumb database 625 with location breadcrumb 610.

Approaching time D, tracking client 640 requests the location of mobile agent 600 from tracking server 620. However, mobile agent 600 has not recently reported its position due to a lack of network availability. Using its breadcrumb database 625 (with history data), tracking server 620 estimates that mobile agent 600 should be near location (2, 6) at time D. Since the accuracy of previous reports by mobile agent 600 have historically differed from the itinerary for this location, tracking server 620 places a 50% degree of certainty on this estimate (an unscientific number chosen to reify this example). Tracking server 620 responds to client 640 by reporting the last known location and estimated location 630 of mobile agent 600.

CONCLUSION

Systems, methods, devices and computer readable media have been shown and/or described in the above embodiments for using a mobile agent to track a mobile device using a plurality of location breadcrumbs in an environment where network access may be unreliable. Although the above descriptions set forth particular embodiments, it will be understood that this is not intended to be limiting. For example, one or more embodiments are not limited to the communication technologies presented herein, and future LBS technologies should not be precluded. Furthermore, the simplified data forms used to represent location, itinerary and history in these embodiments should not be assumed to represent limitations of the location breadcrumbs described by one or more embodiments. Lastly, one or more embodiments are intended to cover capabilities and concepts whether they are via a loosely coupled set of components or converged into one or more integrated components, devices, circuits, and/or software programs.

What is claimed is:

1. A non-transitory computer readable medium having stored thereon, computer-executable instructions that, responsive to execution by a computing device, cause the computing device to perform operations comprising:

receiving, from a tracking client, a registration to receive a location of a mobile agent;

receiving a location breadcrumb from the mobile agent;

storing, in a database, historical accuracy data that includes tracking accuracy of previous location breadcrumbs of the mobile agent and associated itineraries of the mobile agent; and reporting the location of the mobile agent to the tracking client.

2. The non-transitory computer readable medium of claim 1, wherein receiving the registration includes receiving a network address of the tracking client, an identity of the mobile agent, and a reporting interval.

3. The non-transitory computer readable medium of claim 2, wherein the computer-executable instructions, responsive to execution by the computing device, cause the computing device to perform operations further comprising:

reporting the location of the mobile agent to the tracking client by at least one of:

an expiry of the reporting interval; or on demand.

4. The non-transitory computer readable medium of claim 3, wherein the computer-executable instructions, responsive to execution by the computing device, cause the computing device to perform operations further comprising associating a degree of certainty with the location reported to the tracking client.

5. The non-transitory computer readable medium of claim 1, wherein receiving the location breadcrumb includes receiving an actual location of the mobile agent, a time the actual location was valid, and an itinerary of the mobile agent.

6. The non-transitory computer readable medium of claim 5, wherein the computer-executable instructions, responsive to execution by the computing device, cause the computing device to perform operations further comprising storing, in the database, location breadcrumbs reported by one or more mobile agents.

7. The non-transitory computer readable medium of claim 6, wherein the computer-executable instructions, responsive to execution by the computing device, cause the computing device to perform operations further comprising inspecting the database to predict the location of the mobile agent.

8. The non-transitory computer readable medium of claim 6, wherein storing the historical accuracy data comprises storing historical accuracy data that correlates the actual location of the mobile agent with the itinerary of the mobile agent.

9. The non-transitory computer readable medium of claim 8, wherein the computer-executable instructions, responsive to execution by the computing device, cause the computing device to perform operations further comprising inspecting the database to predict the location of the mobile agent.

10. A non-transitory computer readable medium having stored thereon, computer-executable instructions that, responsive to execution by a computing device, cause the computing device to perform operations comprising:

receiving a registration from a tracking client to receive a location of a mobile agent;

receiving a location breadcrumb from the mobile agent, wherein the location breadcrumb comprises the location of the mobile agent, a time the location was valid, and an itinerary of the mobile agent;

predicting the location of the mobile agent using at least one of:

a database of one or more location breadcrumbs; or a database of historical accuracy;

associating a degree of certainty with a predicted location of the mobile agent by using at least one of:

the database of one or more location breadcrumbs to account for differences between previous location breadcrumbs of the mobile agent and the itinerary of the mobile agent; or the database of historical accuracy to account for levels of accuracy between the itinerary of the mobile agent and previous location breadcrumbs of the mobile agent; and reporting the location of the mobile agent to the tracking client.

11. The non-transitory computer readable medium of claim 10, wherein the computer-executable instructions, responsive to execution by the computing device, cause the computing device to perform operations further comprising:

retaining registration data for the tracking client, wherein the registration data comprises a network address, an identity of the mobile agent, and a reporting interval.

12. The non-transitory computer readable medium of claim 11, wherein the computer-executable instructions, responsive to execution by the computing device, cause the computing device to perform operations further comprising:

causing establishment of a network connection to the tracking client;

reporting, using the network connection, the location of the mobile agent to the tracking client by at least one of:

an expiry of the reporting interval; or on demand.

13. The non-transitory computer readable medium of claim 10, wherein the computer-executable instructions, responsive to execution by the computing device, cause the computing device to perform operations further comprising:

receiving the location breadcrumb from the mobile agent via a network connection.

14. The non-transitory computer readable medium of claim 10, wherein the computer-executable instructions, responsive to execution by the computing device, cause the computing device to perform operations further comprising:

storing the location breadcrumb received from the mobile agent in the database of one or more location breadcrumbs.

15. The non-transitory computer readable medium of claim 14, wherein the computer-executable instructions, responsive to execution by the computing device, cause the computing device to perform operations further comprising:

analyzing the database of one or more location breadcrumbs to predict the location of the mobile agent.

16. The non-transitory computer readable medium of claim 10, wherein the computer-executable instructions, responsive to execution by the computing device, cause the computing device to perform operations further comprising:

correlating an actual location of the mobile agent with the itinerary of the mobile agent in the database of historical accuracy.

17. The non-transitory computer readable medium of claim 16, wherein the computer-executable instructions, responsive to execution by the computing device, cause the computing device to perform operations further comprising:

analyzing the database of historical accuracy to predict the location of the mobile agent.

18. A system, comprising:

a non-transitory computer-readable memory configured to store a registration of a tracking client and at least one of:

a database of one or more location breadcrumbs associated with at least one mobile agent; or a database of historical accuracy;

a processor configured to be communicably coupled to the memory, wherein the processor is configured to:

respond to the tracking client registration;
receive a location breadcrumb;
predict a location of the at least one mobile agent to the tracking client;
associate a degree of certainty with a predicted location of the at least one mobile agent by using at least one of:
    the database of one or more location breadcrumbs to account for differences between previous location breadcrumbs of the at least one mobile agent and an itinerary of the at least one mobile agent; or
    the database of historical accuracy to account for levels of accuracy between the itinerary of the at least one mobile agent and previous location breadcrumbs of the at least one mobile agent; and
report the location of the at least one mobile agent to the tracking client.

19. The system of claim 18, wherein the processor is configured to access the memory to query at least one of:
    the database of one or more location breadcrumbs; or
    the database of historical accuracy.

20. The system of claim 18, wherein the processor is configured to:
    cause establishment of a network connection to the tracking client.

* * * * *

UNITED STATES PATENT AND TRADEMARK OFFICE
CERTIFICATE OF CORRECTION

| | | |
|---|---|---|
| PATENT NO. | : 7,860,517 B1 | Page 1 of 1 |
| APPLICATION NO. | : 11/645195 | |
| DATED | : December 28, 2010 | |
| INVENTOR(S) | : Patoskie et al. | |

It is certified that error appears in the above-identified patent and that said Letters Patent is hereby corrected as shown below:

Title page 3, item (56), under "Other Publications", in Column 1, Line 9, delete "Inteligent" and insert -- Intelligent --.

Title page 3, item (56), under "Other Publications", in Column 2, Line 19, delete "Remit" and insert -- Ramit --.

Title page 3, item (56), under "Other Publications", in Column 2, Lines 26-27, delete "Symposium" and insert -- Application Symposium --.

Title page 3, item (56), under "Other Publications", in Column 2, Line 30, delete "Framw" and insert -- Frame --.

Title page 3, item (56), under "Other Publications", in Column 2, Line 35, delete "Appl. I No." and insert -- Appl. No. --.

Title page 4, item (56), under "Other Publications", in Column 1, Line 69, delete "pd&coll" and insert -- pdf&coll --.

Title page 4, item (56), under "Other Publications", in Column 2, Line 4, delete "Teschnischen" and insert -- technischen --.

Title page 5, item (56), under "Other Publications", in Column 1, Line 16, delete "Retreived" and insert -- Retrieved --.

Title page 5, item (56), under "Other Publications", in Column 2, Line 16, delete "Application Oct. 21, 2010," and insert -- U.S. Appl. No. 11/645,200, (Oct. 21, 2010), --.

Column 6, line 61, in Claim 18, delete "computer-readable" and insert -- computer readable --.

Signed and Sealed this
Twenty-fourth Day of May, 2011

David J. Kappos
*Director of the United States Patent and Trademark Office*